United States Patent [19]

Lindenmüeller et al.

[11] 3,987,438
[45] Oct. 19, 1976

[54] TACTILE INDICATING DEVICE

[76] Inventors: Hans-Peter Lindenmüeller; Klaus-Peter Schoenherr, both of Stuttgart, Germany

[22] Filed: June 24, 1975

[21] Appl. No.: 589,752

Related U.S. Application Data

[63] Continuation-in-part of Ser. No. 548,570, Feb. 10, 1975, abandoned.

[30] Foreign Application Priority Data

Feb. 16, 1974 Germany............................ 2407452

[52] U.S. Cl................................. 340/407; 35/35 A
[51] Int. Cl.²......................................... G09B 21/00
[58] Field of Search .............. 340/407; 178/DIG. 32; 35/35 A

[56] References Cited
UNITED STATES PATENTS

| | | |
|---|---|---|
| 2,327,222 | 8/1943 | Sell..................................... 35/35 A |
| 3,229,387 | 1/1966 | Linvill................................. 35/35 A |
| 3,594,787 | 7/1971 | Ickes................................... 35/35 A |
| 3,659,354 | 5/1972 | Sutherland.......................... 35/35 A |

*Primary Examiner*—Harold I. Pitts
*Attorney, Agent, or Firm*—Martin A. Farber

[57] ABSTRACT

An apparatus for representing a tactile character, wherein for each touch button there are provided two magnets arranged at least substantially axially behind each other, of which at least one is an electromagnet, and which magnets by electrical excitation produce a force in the axial direction of the touch button, which force raises or lowers the touch button by means of a magnet core in accordance with the excitation direction. There is coordinated to each touch button, a mechanical, magnetically actuatable locking device, which locking device is operative only on the touch button.

14 Claims, 15 Drawing Figures

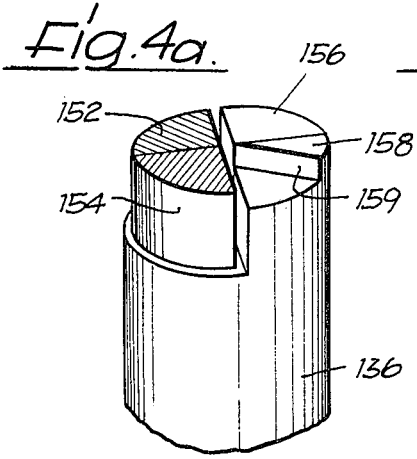
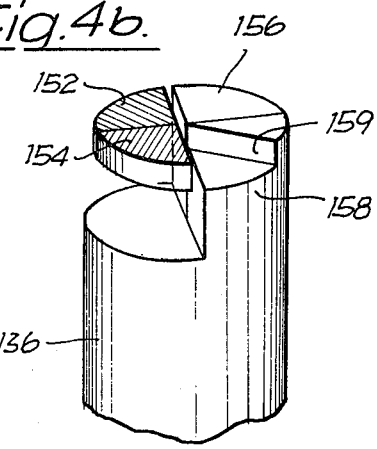
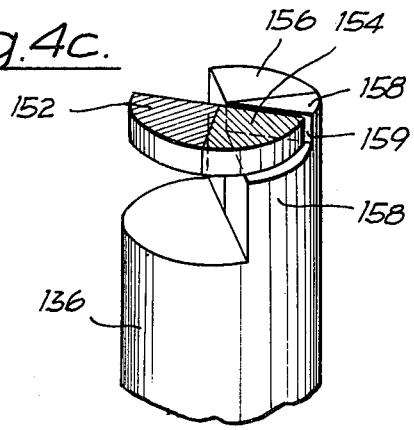

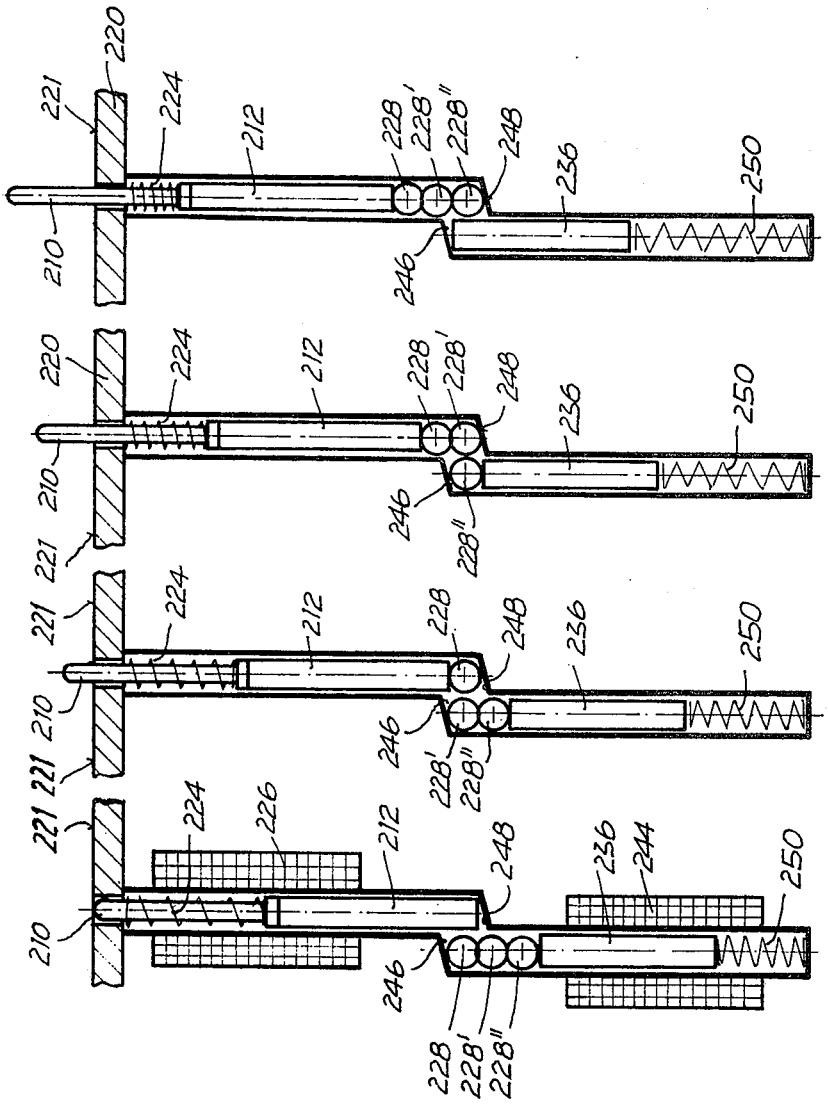

TACTILE INDICATING DEVICE

REFERENCE TO RELATED APPLICATION

The present invention is a continuation-in-part application to our co-pending patent application Ser. No. 548.570, filed on Feb. 10, 1975, now abandoned.

BACKGROUND OF THE INVENTION

The invention relates to an apparatus for representing a tactile, that is, touchable character.

The invention is based on the task and object of producing a device, by means of which not only is there made possible a representation of Braille characters, but also a representation of structure, for example, touchable line designs, diagrams and letters and numbers, on a uniformly latticed board which is faced with touch buttons or pins.

This task is solved in accordance with another object of the present invention in the manner that for each touch button there are provided two magnets arranged at least substantially axially behind each other, of which at least one is an electromagnet, which by electrical excitation produce a force in the axial direction of the touch button, which force raises or lowers the touch button by means of a magnet core in accordance with the excitation direction, and that there is coordinated to each touch button, a mechanical, magnetically actuatable locking means acting only thereon.

The magnets permit the touch buttons to be raised by electrical impulses corresponding to the Braille-characeter or structure to be represented, thus to be made touchable, whereby each touch button can be controlled individually and at will, since two magnets are coordinated to each touch button. In the touchable position, each touch button can be held by the locking means coordinated thereto, until the locking means coordinated thereto again releases it for a lowering by means of a clear signal, whereby likewise every touch button can be controlled individually and at will. It is of particular advantage that no energy is consumed for the storage of the input information, since the locking devices lock the coordinated touch buttons mechanically in the touchable position and no energy is required so long as they are not actuated.

By a preferred embodiment, of which it is an object of the present invention to provide, at least the to be actuated parts of the locking device are arranged in the field of the magnets, and by the force exerted on them are moveable between their unlocking position and their locking position. The particular advantage lies in that no additional magnet is necessary for the actuation of the locking device, but rather for this purpose, the two magnets can be used, by means of which the stroke of the touch button is performed in the one and the other direction.

The formation of the locking device is possible in various manners in accordance with the present invention. In an advantageous embodiment form in accordance with another object of the invention, the locking device comprises at least one magnetically actuatable locking body which is moveable arranged in a guide. The track formed by this guide has at least one component which is radial to the direction of movement of the touch button. Further, at least one component of the magnetic field which actuates the locking body runs in the direction of this track. By one such formation of the locking device, the locking bodies can be balls or rollers, thus very simple bodies. One obtains thereby a constructively simple and very reliable operating apparatus.

In accordance with still another embodiment of the invention, the locking device comprises a plurality of locking bodies which are moveable in the guide individually and sequentially each by an impulse excitation of the magnetic field which actuates the locking bodies, wherein then the touch buttons can be locked in various positions of height over the board- or touch- plane in a simpler manner by means of repeated impulse-like control of the magnets. The position corresponds thereby to the number of the locking bodies located in the locking position, which can be arranged there next to one another in the direction of the longitudinal axis of the touch body. By the use of several locking bodies three dimensional representation is made possible. This means that, for example, grey or intermediate values can be reproduced, thus tactile pictures with grey tones can be produced.

By another advantageous embodiment form in accordance with yet another objective of the invention, the locking device comprises at least one magnetically actuatable locking body, which is arranged, in a magnetic field, rotatable about the longitudinal axis of the touch button or an axis parallel thereto, which magnetic field has at least one component acting on the locking body in a tangential direction. For the locking of the touch button and its unlocking one obtains here a rotational moment, which in connection with the force acting on the touch button in the longitudinal direction thereof leads to a combination up or down stroke and rotational movement.

In order not to have to control the correct time expiration of the combination stroke-rotational movement by means of a mechanical guide, which would be disadvantageous on the grounds of space as well as on the grounds of reliability and construction expense, in a preferred embodiment in accordance with another object of the invention, the locking device comprises two locking bodies which are rotatable relative to each other around the longitudinal axis of the touch button or an axis parallel thereto and displaceable in the direction of this axis, of which one of the locking bodies is rigidly connected with the touch button and the other is disposed stationarily. The first locking body is thereby formed as an axial projection with sector shaped cross-section on the end of the magnetic core thereof, which end points away from the touchable end of the touch button, and the second locking body is formed as an axial projection of a stationary magnetic core. Both locking bodies in this embodiment have, in advantageous manner, in peripheral direction next to one another, a part made of magnetic material and a part made of non-magnetic material. Moreover in this case the two locking bodies are arranged in peripheral direction adjacent to one another in the manner such that the parts made of magnetic material lie adjacent to each other. Further, the part made of non-magnetic material of the one locking body is equipped on the side pointing to the other locking body with at least one step reduced in its height. The part of the other locking body, which part is made of non-magnetic material catches in this step in the locking position. The axial movement as well as the rotational movement of the locking bodies is attained thus by the form given to them and the material used for them.

A particular advantage of the invention is to be seen in that it is possible to arrange the touchable buttons in the lattice size of 2.5 mm standardized for purposes of the blind in an arrangement of points, lines or areas, in order to make information accessible to the blind in an economical manner in material and time, whereby the holding force required for the purposes of touching is achieved in sufficient magnitude without energy consumption. Thus the invention permits the production of tactile letters for the blind as well as tactile pictures. By the use of a plurality of locking bodies for each locking device additionally in a particularly simpler manner, besides black-white information also gray tonal values can be converted into the tactile equivalent. When the individual setable buttons are composed int a matrix in the standardized lattice size, a text in Braille-characters and likewise a more or less digitized picture can be reproduced. Thereby each button can be individually controlled by shift registers in the X- and Y- direction of this matrix.

BRIEF DESCRIPTION OF THE DRAWINGS

With the above and other objects and advantages in view, the present invention will become more clearly understood from the following detailed description of preferred embodiment forms in connection with the accompanying drawings, in which:

FIGS. 4a, and 4b and 4c are perspective illustrations partly in section of the locking device of the second embodiment example in the unlocked position, one intermediate position, and the locking position, respectively;

FIGS. 5a, 5b, 5c and 5d are schematic longitudial sections of a third embodiment example, in which FIG. 5a shows the touch button in the unlocked position, and FIG. 5b to FIG. 5d show the touch button in three different circumstances of locked stroke positions;

DESCRIPTION OF THE PREFERRED EMBODIMENT

Figure 1:
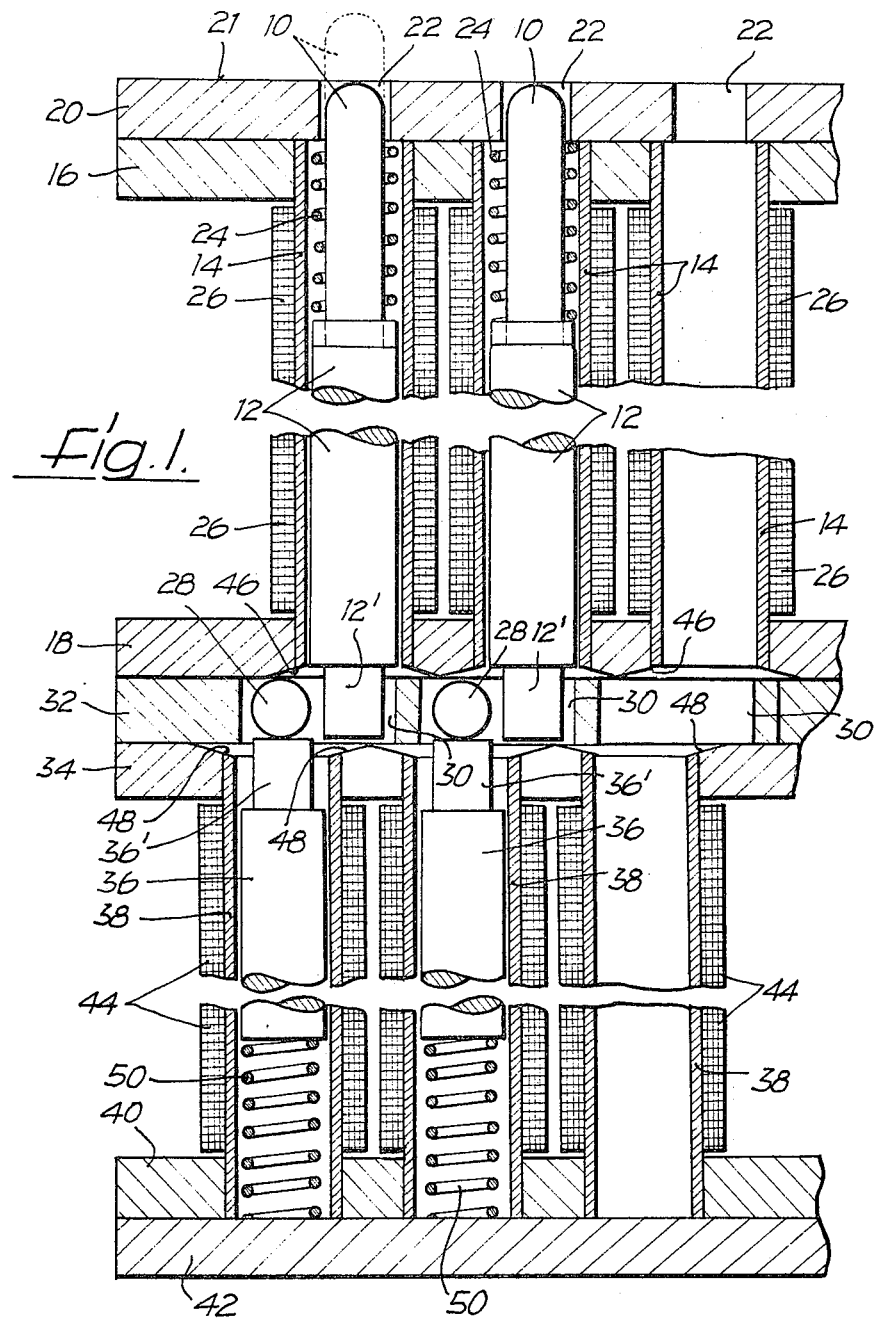
FIG. 1 is a longitudinal sectional view partly broken away of a first embodiment example of a device for producing a tactile character in accordance with the present invention.

Referring now to the drawings, in accordance with the present invention a device for the representation of a tactile picture comprises a plurality of touch buttons or pegs 10 assembled to a matrix, which are spaced by a distance of 2.5 mm from one another, thus providing the lattice measure, standardized for characters for the blind. Since all touch buttons and the construction parts provided for their actuation are formed alike, in the following only one individual of the devices disposed adjacent to one another is described.

The touch peg 10 is rigidly integrally connected at is not touchable end with a cylindrical magnet core 12, the latter having a somewhat larger diameter than that of the touch peg 10. The magnet core 12, and therewith the peg 10, is displaceably guided in a guide sleeve 14, the latter being made of a non-magnetic material with good slide characteristics relative to the core 12. In the embodiment example the guide sleeve is made of synthetic material. However also brass, for example, would be suitable. Two plates 16 and 18 which are arranged parallel and spaced from each other, receive in a bore formed therein, respectively, the two ends of the guide sleeve 14. A plate 20 lies on the plate 16, which plate 20 forms the touch plane 21, thus is common to all touch pegs 10 and has a bore 22 for each touch peg. The diameter of the bore 22 is smaller than the inner diameter of the guide sleeve 14. In this manner a helical spring 24 concentrically surrounding the touch peg 10, which spring produces a return setting or restoring force, can on one side be supported on an annular collar on the end of the touch peg 10 which is connected with the magnet core 12 and on the other side can be supported on the plate 20.

The guide sleeve 14 is concentrically surrounded by the coil 26 of a first electromagnet. When this coil is excited the magnetic core 12 is drawn therein and lifts the touch peg 10 against the force of the helical spring 24 over the touch plane 21 into the touchable position illustrated in dot-dash lines in FIG. 1.

By this stroke movement of the magnetic core 12, the reduced diameter end 12' thereof which points away from the touch peg 10 draws therewith a locking body 28 of a locking device, as a result of the magnetic forces which the magnetic field originating from the magnetic core 12 exerts on the locking body 28 of magnetic material. In the unlocking position illustrated in FIG. 1, the locking body 28 is positioned radially adjacent to the end 12' in a space 30 in which also the end 12' projects, the locking body 28 being formed as a ball, however, which locking body could also be another roller body, for example, a cylindrical roll or the like. This space 30 is formed by an opening in a plate 32, the latter lying between the plate 18 of the first electromagnet and a plate 34 of a second electromagnet. Since by means of the impulse by which the magnetic core 12 is lifted, the locking body 28 is moved toward the right in a view direction according to FIG. 1, and comes to lie in a position on the plate 34, which position is underneath the free face surface of the end 12' of the magnetic core 12. After the decay of the impulse, the helical spring 24 presses thereby the end 12' against the locking body 28, which however no longer can return into the starting position illustrated in FIG. 1, since the space there is now occupied by the reduced diameter end 36' of the cylindrical magnetic core 36 of the second electromagnet. The magnetic core 36, the longitudinal axis of which lies parallel to the longitudinal axis of the magnetic core 12, is offset in radial direction of the magnetic core 12 so far that it is aligned on the locking body 28, when the latter lies in its unlocking position radially adjacent to the end 12' of the magnetic core 12.

The magnetic core 36 is axially displaceably guided in a guiding sleeve 38 which is formed as the guiding sleeve 14, and engages on both of its respective ends, in a bore of the plate 34 and a bore of the plate 40, respectively, the plate 40 lying on a base plate 42. The guiding sleeve 38 is surrounded by a coil 44 lying between the two plates 32 and 40, which coil is formed as the coil 26.

Inclined support surfaces 46 and 48 of the plates 18 and 34, respectively, for the locking body 28 facilitate the shifting of the latter in the locking position or the unlocked position. Since in both positions the locking body is pressed against its support surface by the return position springs, there is exerted on the locking body by the return position springs a force component which acts in the sense of a shifting into the other end position.

If the locking body 28 is positioned in the locking position, thus in engagement on the face surface of the end 12', then by means of an impulse-like excitation of the coil 44 the magnetic core 36 is moved toward the base plate 42, counter to the force of its return position spring 50, the latter being likewise arranged in the guiding sleeve 38 and supported on one side on the base plate 42 and on the other side on the magnetic core. Thereby the locking body 28 is drawn therewith by the magnetic field acting thereon as well as the force component which is effective in radial direction by means of the inclination of the support surface 48. The locking body 28 comes in this manner in engagement on the face surface of the end 36' of the magnetic core 36. Thus the helical spring can now move the touch peg 10 and the magnetic core 12 again into the position illustrated in FIG. 1, in which the character represented previously by the touch pin 10 is cleared. As soon as the excitation of the coil 44 ends, the return position spring 50 presses the magnetic core 36 toward the plate 18 so far until the locking body 28 engages on the latter. Because thereby an impact is exerted by the locking body 28 on the plate 18 (a corresponding impact on the plate 34 being exerted when the locking body is pushed in the locking position against the plate 34), the plates 18 and 34 are made of a material with a low modulus of elasticity and a high impact resistance (shock-proof), thus a material with insignificant impact wear and tear. In the embodiment example, although not limited thereto, thus a synthetic material is provided for these plates. A synthetic material is also advantageous, in so far as the plates 18 and 34 must be made of a non-magnetic material.

A non-magnetic corrosion resistant material is suitable for the touch pin 10, for example synthetic material V2A-steel or China or German silver.

With the embodiment example illustrated in FIGS. 2a to 4c, likewise as with the previously explained embodiment example, a plurality of touch pegs can be arranged adjacent to one another under formation of a standardized lattice measure of 2.5 mm, since also the dimensions of this embodiment example are sufficiently small, and each touch peg can be moved independently from the others.

The touch peg 110 is secured on an end of a cylindrical magnetic core 112, the latter, and therewith the touch peg, being rotatably and axially displaceably guided in a sleeve-like coil housing 114 which is made of synthetic material. The coil housing 114 receives the excitation coil 126 of a first magnet. A section 115, the diameter of which is adjusted to the desired lattice measure is connected to the end of the section of the coil housing carrying the excitation coil 126, which end points away from the touch plane 121. A further section, which in the embodiment example carries the excitation coil 144 of the second magnet and originates on a base plate 142, follows the section 115. A magnetic core 136 is stationarily arranged in the section carrying the excitation coil 144, which magnetic core could, however, also constitute a permanent magnet. The coil 144 would then be unnecessary.

Figure 3A:
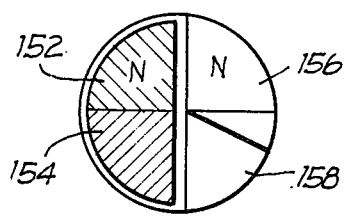
FIGS. 3a and 3b are sections along the lines 3 — 3 of FIGS. 2a and 2b, respectively.
Figure 3B:
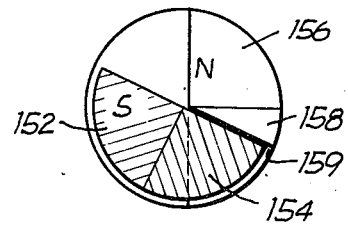

For the formation of a locking device, a continuation is provided on the end of the magnetic core 112, which end points away from the touch peg 110, and which end projects in the section 115 of the coil housing 114, the continuation having a semi-circular cross-sectional surface, as particularly evident in FIG. 3a. The axial height of this projection, whose plane surface area pointing to the central longitudinal axis, in this embodiment is selected somewhat larger than the stroke of the touch peg. The projection comprises a first part 152, which has a cross-sectional surface in the shape of a sector with a central point angle of 90°, as well as a second part 154 of the same cross-sectional shape which contiguously connects on the first part. The first part 152 is made of magnetic material, the second part 154 being made of non-magnetic material.

Likewise on the end of the magnetic core 136 pointing to the magnetic core 112, a projection is provided which projects in the inner space of the section 115. This projection, as the other projection, is made of a first part 156 with sector-shaped cross-section, whereby the central point angle amounts to 90°, and a second part 158 which contiguously adjoins on the first part. The first part 156 is made of a magnetic material, the second part 158 being made of a non-magnetic material. As particularly shown in FIGS. 4a and 4b the second part 158 has in connection with the first part its full height only over an angular range of substantially 25° in the embodiment example. The remaining section has a reduced height, which corresponds to the required stroke of the touch pin 110.

Figure 2A:
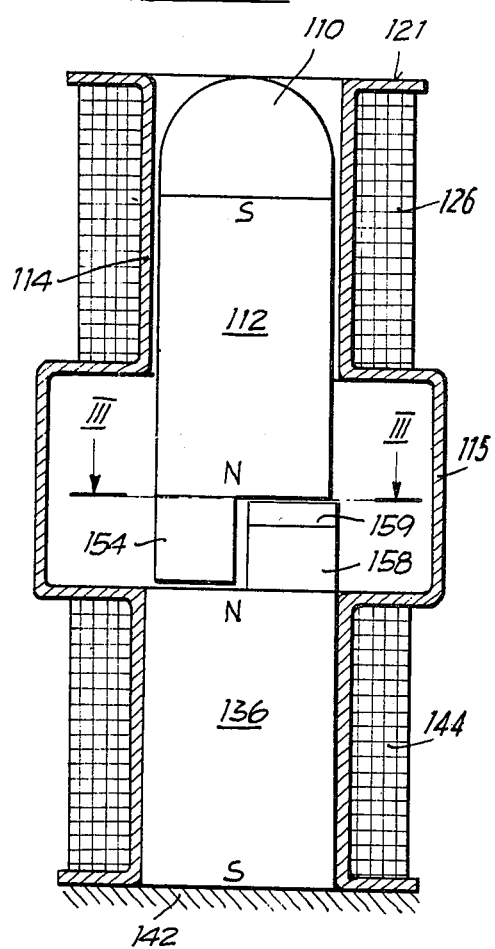
FIGS. 2a and 2b are longitudinal sections of a second embodiment example of the invention in the two positions of the touch button, respectively.

The two projections form the locking device and are thus arranged such that in the FIG. 2a illustrated, lowered not locked position of the touch pin, the first two parts 152 and 156 which are made of magnetic material, are arranged adjacent each other under formation of a gap. If in this position, the two coils 126 and 144 become excited so that there exists like poles on the two first parts 152 and 156, then there is exerted on the first part 152 and the magnetic core 112, the latter being formed integrally therewith, a rotational moment as well as a stroke force. The rotational moment can initially perform only a rotation up to the engagement of the second part 154 on the other second part 158. As a consequence of the stroke force, the magnetic core 112 is simultaneously moved upwardly, thus away from the magnetic core 136. As soon as the touch pin is raised in the necessary measure, the projection of the magnetic core 112 thus has been shifted in axial direction to the height of the lower section of the second part 158, and the position illustrated in FIG. 4b is attained, and as a consequence of the rotational moment acting on the first part 152, the magnetic core 112 is swung, together with its projection and the touch pin 110, into the position illustrated in FIGS. 2b, 3b and 3c. In this position the lower side of the second part 154 covers the lower section of the second part 158 and engages on the step 159 between the two sections. In this position the touch peg 110 is locked in its touchable or set position. For the clearing of the information reproduced by the touch pin, thus for the guiding back of the touch pin 110 into the position illustrated in FIG.

Figure 2B:
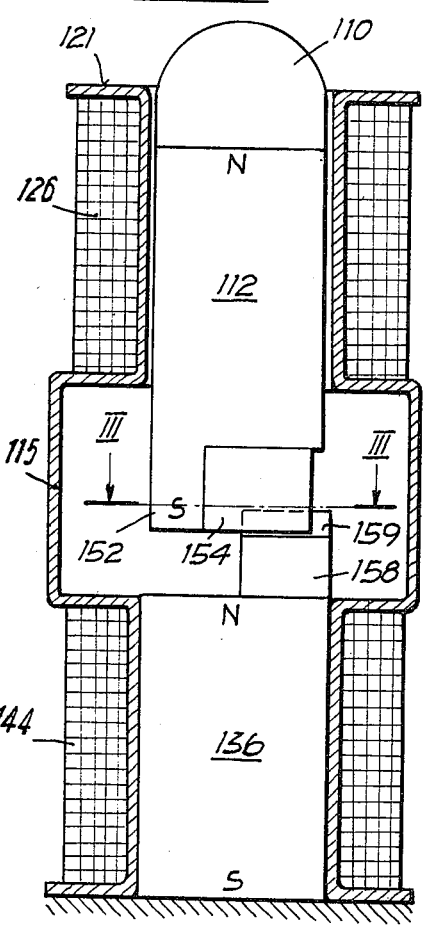

2a, the excitation direction of the coil 126 or the coil 144 is changed. In this manner, there is developed by an impulse-like excitation, for example, a south pole on the first part 152 (compare FIG. 3b), while as before there exists a north pole on the first part 156. The opposite polarity of these two poles has the result that there is exerted on the first part 152 a rotational moment in the sense of an approaching of the two poles together. In this manner the magnetic core 112 is turned so far until the second part 154 no longer covers over the part 158, thus occupying the position according to FIG. 3a. There, on account of the opposite polarity of the poles, also a force directed toward the magnetic core 136 is exerted on the magnetic core 112, as FIG. 2b shows, and the magnetic core 112, by the impulse with which the coil 126 is excited, again is lead back to the starting position according to FIG. 2a.

From the previous description it is apparant that the polarity of one of the poles is not changed. Thus this pole can be formed by a permanent magnet. In this manner one of the two coils is elminated, preferrably the coil 144.

FIGS. 5a through 5d illustrate a third embodiment example, which is formed basically as the first embodiment example according to FIG. 1 and only differs from this in the manner that the locking device has three locking bodies 228, 228° and 228″. Thus in FIGS. 5a through 5d there are illustrated only the necessary parts for the understanding of this modification and the varied manner of operation which thereby results.

When the touch pin or peg 210 is completely drawn back, thus does not project over the touch plane 221 which is formed by the upper side of the plate 220, the return position spring 224 holds the end of the magnetic core 212 which points away from the touch peg 210 in engagement on the inclined support surface 248 for the locking bodies, the latter being formed as balls or rollers, when they are located in the locking position.

The three locking bodies, as shown in FIG. 5a, in this completely drawn back position of the touch peg 210, lie in the longitudinal axis of the core 236 of the second magnet, to which second magnet belongs the coil 244, the second magnet being arranged axially below the first magnet and relative to the latter laterally somewhat offset. Under the effect of the return position spring 250, which is coordinated to the magnetic core 236, the locking bodies are held in engagement on each other, the uppermost locking body being in engagement on the inclined engagement surface 246 and the magnetic core 236 being in engagement on the lowermost locking body 228″.

As FIGS. 5b through 5d illustrate, the touch peg 210 can be mechanically locked in three differently sized projecting lengths above the touch plane 221. In order to be able to bring the touch peg 210 in the position with the smallest projecting length above the touch plane 210 (FIG. 5b), the coil 226 which is coordinated to the magnetic core 212 is excited with an electrical impulse of such level and duration that the touch peg 210 together with the magnetic core 212 is axially displaced in the necessary measure and only the upper most locking body 228 is moved into the locking position (FIG. 5b). The spring 250 pushes the magnetic core 236 upwardly by the diameter of the locking body 228, so that now the locking body 228' engages on the inclined engagement surface 246.

By means of a second impulse-like excitation of the coil 226, the touch peg 210, the magnetic core 212 and the locking body 228 are moved upwardly so far that the second locking body 228' can enter into the locking position (FIG. 5c). The magnetic core 212 is supported thus over two locking bodies on the support surface 248. The projecting length of the touch peg 210 is consequently now twice as large as in the position according to FIG. 5b.

By means of a third impulse-like excitation of the coil 226, the third locking body 228″ attains the locking position (FIG. 5d), so that now there is obtained the maximum projecting length of the touch peg 210 above the touch at as plane.

In order to again lower the touch peg 210, the coil 244 is excited with impulses which are sized such that one locking body after the other is moved in the unlocking position, whereby by means of the inclined support surface 248 and the magnetic field produced by the coil 244, it is attained that from time to time a locking body is moved toward the left in a view direction according to FIGS. 5a through 5d, as soon as the magnetic core 236, and under circumstances a locking body engaging on its front surface, is moved downwardly so far that the path is free for the locking body to be transferred into the unlocking position.

The apparatus according to FIGS. 5a and 5d is suitable for the illustration of grey steps or values, since for example, the position according to FIG. 5a can be assigned "white", the position according to FIG. 5b "grey 1", the position according to FIG. 5c "grey 2", and the position according to FIG. 5d "black". If, for example, the grey tone "grey 2" is to be illustrated, the coil 226 is excited with two successive impulses. The clearing of the recorded information follows three successive impulses, since thereby it is assured that the touch peg 210 returns into the completely withdrawn position.

Figure 6:
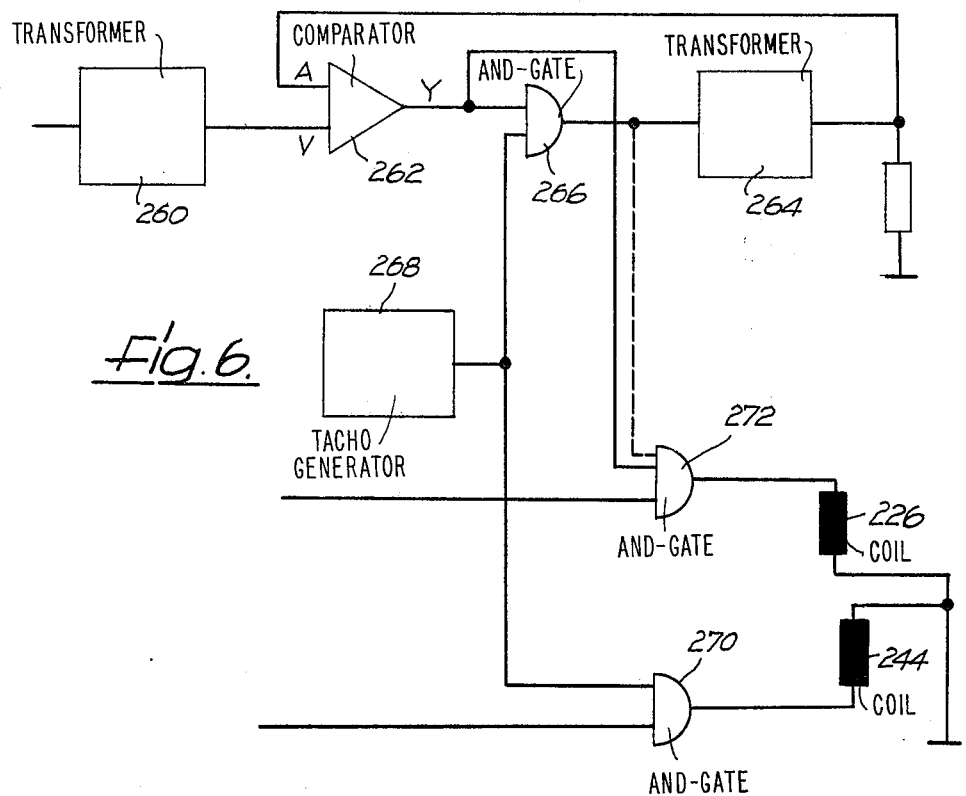
FIG. 6 is a block diagram of the control device of the embodiment example according to FIGS. 5a to 5d.

Such a picture reproduction can result with the help of the control illustrated in FIG. 6, whereby one such control is necessary for each touch pin.

Figure 7:
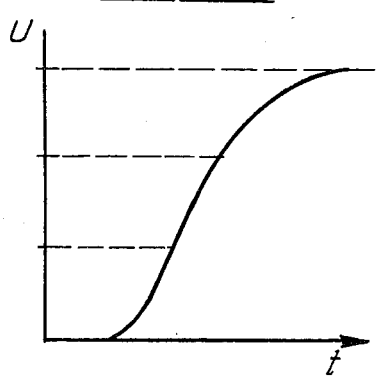
FIG. 7 is a graph of the time course of a video signal in analogue form, the information content of which can be reproduced with the embodiment example according to FIGS. 5a to 5d.
Figure 8:
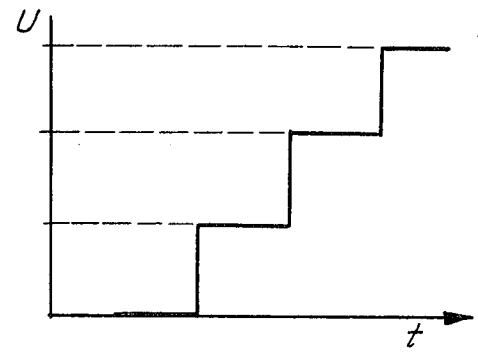
FIG. 8 is a graph of the time course of a video signal in discrete form, the information content of which can be tactilely reproduced with the embodiment example according to FIGS. 5a to 5d.

The video signal produced for example by a photoelectric transformer 260 can swing, corresponding to the picture information between the values 0 volts and signal maximum. If one assigns the value 0 volts to the information "white" and the signal maximum to the information "black", then the two grey values "grey 1" and "grey 2" are coordinated to voltage levels lying intermediate thereto, as this is shown in FIGS. 7 and 8. The signal illustrated in FIG. 7 relates to such a signal wherein the grey tone can be reproduced in an analogous size, whereas the video signal according to FIG. 8 represents descrete steps for the different grey values. Both types of signals can be processed.

For setting of the touch pin, that is for the setting of the picture point, the instantaneous signal level is examined with the help of a comparator 262. The outlet of the transformer 260 is connected to one input of the comparator and the outlet of a digital analogue transformer 264 is connected to the other input. The input of the transformer 264 is connected to the output of an AND-gate 266, one input of the latter being connected with the output of the comparator 262. A tacho- or frequency pulse generator 268 is connected to the other input of the AND-gate 266. Further, one input of an additional AND-gate 272 is connected to the output of the comparator 262, the AND-gate 272 being there-after connected to the coil 226. The setting signals are fed to the other input of the AND-gate 272.

The output signal Y of the comparator 262 lies on the logic value "H" when the voltage "A" given at the output of the digital analogue transformer 264 is smaller than the video signal "V". In this manner, the pulses delivered from the tachogenerator 268 can pass to the digital analogue transformer 264 over the AND-gate 266. The voltage at the output of the digital analogue transformer 264 is thereby raised until it becomes greater than the video signal "V". At this moment the output signal "Y" is set by the comparator to the logic value "L".

For the movement of a locking body from the unlocking position to the locking position, there is required a definite time $T_R$ corresponding to the geometric dimensions, which time is dependent on the time constant of the mechanical system. By the fixing or timing of the cycle frequency of the frequency generator 268, it can be assured that the time length of the signal Y when it represents the logic value "H" corresponds to the value 0 for the case that the video signal represents "white" (in this case the touch pin 210 is not lifted), corresponds to the value $1T_R$ if the video signal corresponds to the grey tone "grey 1" (the touch pin is raised by the diameter of the locking body 228), corresponds to the value $2T_R$ if the video signal corresponds to the grey step "grey 2"(the touch pin is raised by the sum of the diameters of the locking bodies 228 and 228'), and corresponds to the value $3T_R$ if the video signal corresponds to "black". These quantized lifting strokes can be achieved corresponding to the time length of the output signal Y (0, $1T_R$, $2T_R$, ... $(n-1)T_R$, $nT_R$) as well as also over single pulses, which arise at the output of the AND-gate 266. In the last mentioned case, the connection illustrated dashed in FIG. 6 is necessary. With single pulses the cycle frequency must be halved.

The clearing of the picture points, thus the guiding back of the touch pin 210 into the position according to FIG. 5a, is possible by two different types. In a first method, an AND-gate 270, which is connected at its output to the coil 244, is opened with the help of an impulse of the length $nT_R$, by the example illustrated in FIG. 5d thus $3T_R$. This pulse is fed to one input of the AND-gate 270. The other input is connected to the frequency generator 268. The cycles of the frequency generator switch back the touch pin 210 with maximum stroke number per unit time. Hence any desired grey stage as well as the stages "black" to "white" are set, independent of whether its actual position corresponded to the value "black" or "grey".

By the second method, the position of the touch pin is stored with the help of an electronic memory or storage. In this manner the position of the touch pin is known in case of clearing. It suffices therefor, to set the touch pin on "white" or the value corresponding to the new information with the number of pulses corresponding to its position.

Since in all of the described embodiments, the touch pin can be lead by a setting pulse back into a first stable position, and by a release pulse again in the starting position, which likewise is a stable position, the device in accordance with the present invention also can be used for any purpose as a mechanical flip-flop with most extremely small dimensions. In this respect the device of the present invention also constitutes a mechanical flip-flop.

While we have disclosed several embodiments of the present invention, it is to be understood that these embodiments are given by example only and not in a limiting sense.

We claim:

1. A device for representing at least one tactile character, comprising
at least one touch member,
two magnets for each of said at least one touch member, said two magnets arranged at least substantially axially behind one another,
at least one of said magnets constituting an electromagnet,
a magnetic core means for raising and lowering said touch member when said core means is actuated,
said touch member and said magnets being oriented such that by electrical excitation, said magnets produce a force in an axial direction of said touch member, said core means for being actuated by said force for said raising and lowering, respectively, of said touch member corresponding to a direction of said electrical excitation, and
a mechanical, magnetically actuatable locking means operatively coordinated to each of said at least one touch member, said locking means for being operative only on said at least one touch member, respectively.

2. The device as in claim 1, wherein
said locking means includes at least one part to be actuated,
at least said at least one part is disposed in the magnetic field of said magnets, and
said at least one part is moveable between an unlocking position thereof and a locking position thereof by means of said force exerted over said field on said at least one part.

3. The device as in claim 1 further comprising
a guide forming a track, the latter has at least one component radial to a direction of movement of said touch member,
said locking means includes at least one mechanically actuatable locking body, the latter moveably disposed in said guide, and
said magnetic field has at least one component running in a direction of said track, said magnetic field operatively actuating said locking body.

4. The device as in claim 3 wherein
said locking means includes a plurality of said locking bodies, the latter disposed in said guide moveably singly and successively by a respective impulse excitation of said magnetic field between an unlocking position and a locking position, said magnetic field operatively actuating said locking bodies, said locking bodies constitute means by which said touch member is lockable in different stroke positions corresponding to the number of said locking bodies in said locking position.

5. The device as in claim 1 wherein
said locking means includes at least one magnetically actuatable locking body,
said touch member defines a longitudinal axis,
said at least one locking body is rotatably disposed in the magnetic field of said magnets about an axis at least parallel to said longitudinal axis, and said magnetic field has at least one component action on said at least one locking body in a tangential direction relative thereto.

6. The device as in claim 5 wherein said axis at least parallel to said longitudinal axis constitutes said longitudinal axis.

7. The device as in claim 5 wherein
said locking means includes two of said locking bodies, the latter rotatable relative to each other about said axis at least parallel to said longitudinal axis as well as displaceable in a direction of said axis at least parallel to said longitudinal axis, and
one of said locking bodies is integrally connected with said touch member and the other of said locking bodies is stationarily disposed.

8. The device as in claim 7 wherein
said axis at least parallel to said longitudinal axis constitutes said longitudinal axis.

9. The device as in claim 7 wherein
said one of said locking bodies is formed as an axial projection with sector shaped cross-section on an end of said magnetic core means, said end pointing away from said touch member,
a stationary magnetic core has an axial projection forming said other of said locking bodies,
said two locking bodies comprise in peripheral direction adjacent each other first parts, respectively, of magnetic material and second parts, respectively, of nonmagnetic material,
said two locking bodies are arranged in peripheral direction adjacent each other such that said first parts are disposed adjacent one another, and one of said second parts of one of said locking bodies is formed with at least one step having a reduced height on a side pointing to another of said locking bodies.

10. The device as in claim 1 wherein
said at least one touch member comprises a plurality of touch members, each having operatively coordinated thereto said two magnets, respectively, and one of said locking means, respectively, all assembled to a matrix for producing a tactile picture,
each of said locking means comprises a number constituting at least one locking body, said number being one if a tactile picture with an absense of grey tonal values is to be produced and being greater than one if a tactile picture with grey tonal values is to be produced, respectively, and
means for controlling said matrix operatively connected thereto.

11. The device as in claim 10 wherein
said control means includes a photoelectric transformer means for converting an optical picture to be represented in tactile form into electrical signals.

12. The device as in claim 1 wherein
said device constitutes a mechanical flip-flop.

13. The device as in claim 1 wherein
said touch member constitutes a touch pin.

14. The device in claim 1, wherein
said locking means is a circularly shaped body.

* * * * *